(12) United States Patent
Dippl et al.

(10) Patent No.: US 9,373,199 B2
(45) Date of Patent: Jun. 21, 2016

(54) AUTONOMOUS SYSTEM, DEVICE AND METHOD TO PROVIDE DATA OF THE AUTONOMOUS SYSTEM

(71) Applicant: Siemens Aktiengesellschaft, Munich (DE)

(72) Inventors: Sebastian Dippl, Munich (DE); Robert Eidenberger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 14/255,295

(22) Filed: Apr. 17, 2014

(65) Prior Publication Data

US 2014/0316640 A1    Oct. 23, 2014

(30) Foreign Application Priority Data

Apr. 17, 2013    (DE) .......................... 10 2013 206 948

(51) Int. Cl.
| | |
|---|---|
| *G06F 7/00* | (2006.01) |
| *G07C 5/00* | (2006.01) |
| *G06Q 10/06* | (2012.01) |

(52) U.S. Cl.
CPC ............... *G07C 5/008* (2013.01); *G06Q 10/06* (2013.01)

(58) Field of Classification Search
CPC .... G07C 5/008; G07C 5/0808; G06F 11/366; G06F 17/30241
USPC ................................................ 701/2; 700/66
See application file for complete search history.

(56) References Cited

U.S. PATENT DOCUMENTS

| | | | | |
|---|---|---|---|---|
| 2001/0041566 A1* | 11/2001 | Xanthos | .............. | H04L 41/5032 455/423 |
| 2007/0100585 A1* | 5/2007 | Dulberg | .............. | G06F 11/0748 702/184 |
| 2007/0271014 A1* | 11/2007 | Breed | ...................... | B60J 10/00 701/31.9 |
| 2009/0094422 A1* | 4/2009 | Kerns | .................... | G06F 3/0607 711/161 |
| 2009/0309709 A1* | 12/2009 | Bevacqua | .............. | B60R 25/102 340/426.18 |
| 2011/0055172 A1* | 3/2011 | Tan | ................... | G06F 17/30241 707/692 |
| 2011/0231055 A1* | 9/2011 | Knight | .................. | G07C 5/008 701/31.4 |
| 2012/0036016 A1* | 2/2012 | Hoffberg | ............... | G05B 15/02 705/14.58 |
| 2012/0215378 A1* | 8/2012 | Sprock | .................... | E02F 9/205 701/2 |

(Continued)

OTHER PUBLICATIONS

Beard et al. Autonomous Vehicle Technologies for Small Fixed-Wing UAVs, Journal of Aerospace Computing, Information, and Communication, vol. 2, (2005), pp. 92-108.

(Continued)

*Primary Examiner* — Redhwan K Mawari
(74) *Attorney, Agent, or Firm* — Schiff Hardin LLP

(57) ABSTRACT

A device to provide data of an autonomous system is configured to receive, from the autonomous system, data that are generated by the autonomous system, and to send the received data to an archiving device for storage. The archiving device is arranged external to the autonomous system and is independent of the operation of the autonomous system. The device provides the stored data for an independent evaluation device. An improved data provision is ensured by the storage of the data accumulating in the autonomous system, independent of the operation of the autonomous system. The provided data can be used for maintenance or setup of the autonomous system. An autonomous system includes such a device, and a method to provide data of an autonomous system; and a method to produce an autonomous system operate by using such a device.

13 Claims, 2 Drawing Sheets

(56) References Cited

U.S. PATENT DOCUMENTS

| | | | |
|---|---|---|---|
| 2012/0233418 A1* | 9/2012 | Barton | G06F 17/30575 |
| | | | 711/162 |
| 2012/0233490 A1* | 9/2012 | Barton | H04L 67/1095 |
| | | | 713/503 |
| 2013/0253797 A1* | 9/2013 | McNew | G06N 99/005 |
| | | | 701/98 |
| 2014/0316640 A1* | 10/2014 | Dippl | G07C 5/008 |
| | | | 701/33.4 |

OTHER PUBLICATIONS

Campos et al., A Reference Architectuer for Remote Diagnostics and Prognostics Applications, IEEE Autotestcon Proceedings, Systems Readiness Technology Conference, vol. Conf. 38 (2002), pp. 842-852.

German Wikipedia entry: Skalierbarkeit.

Wikipedia entry: Scalability.

\* cited by examiner

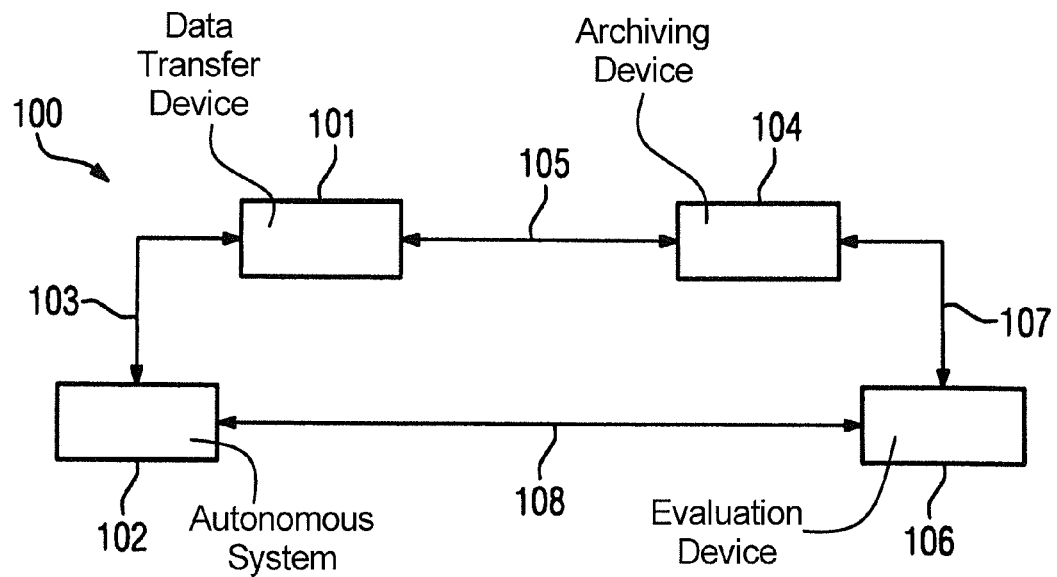
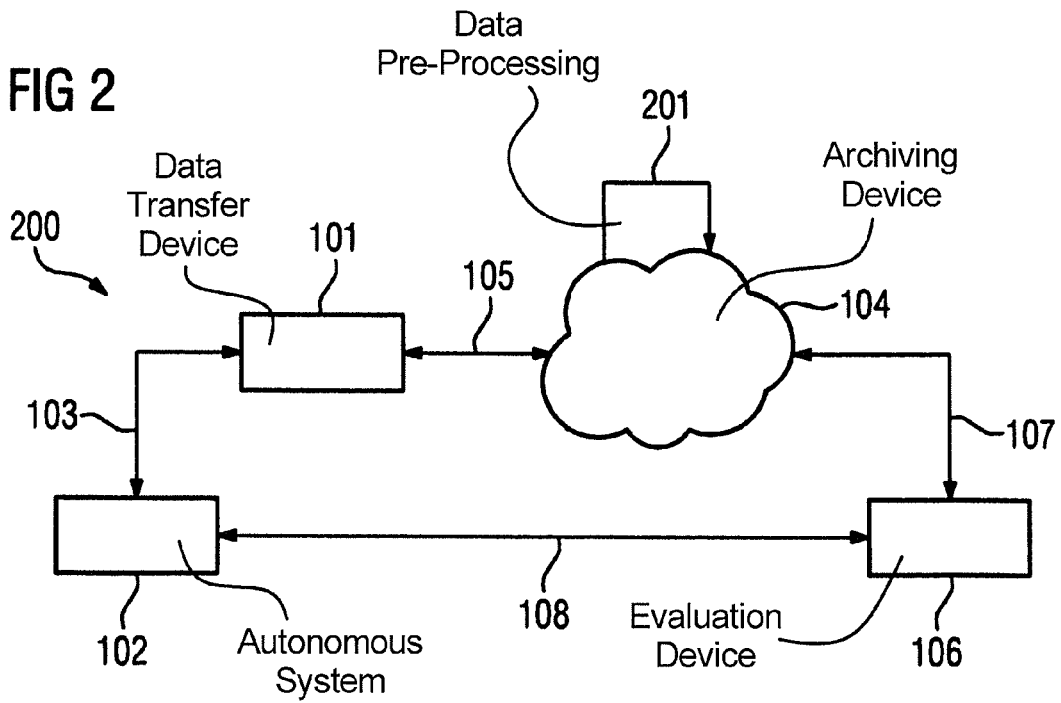

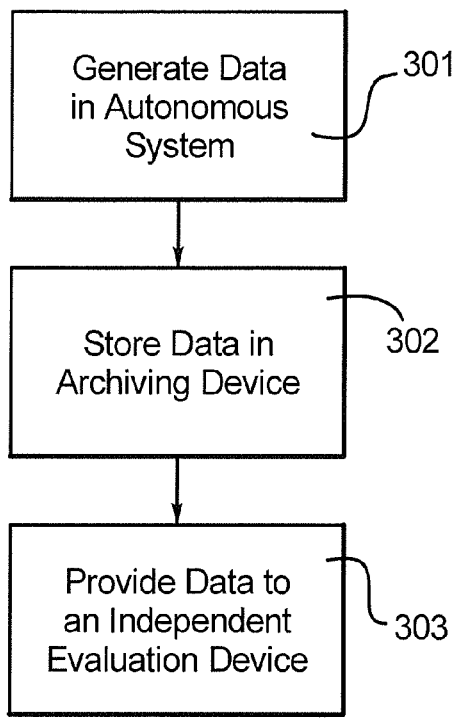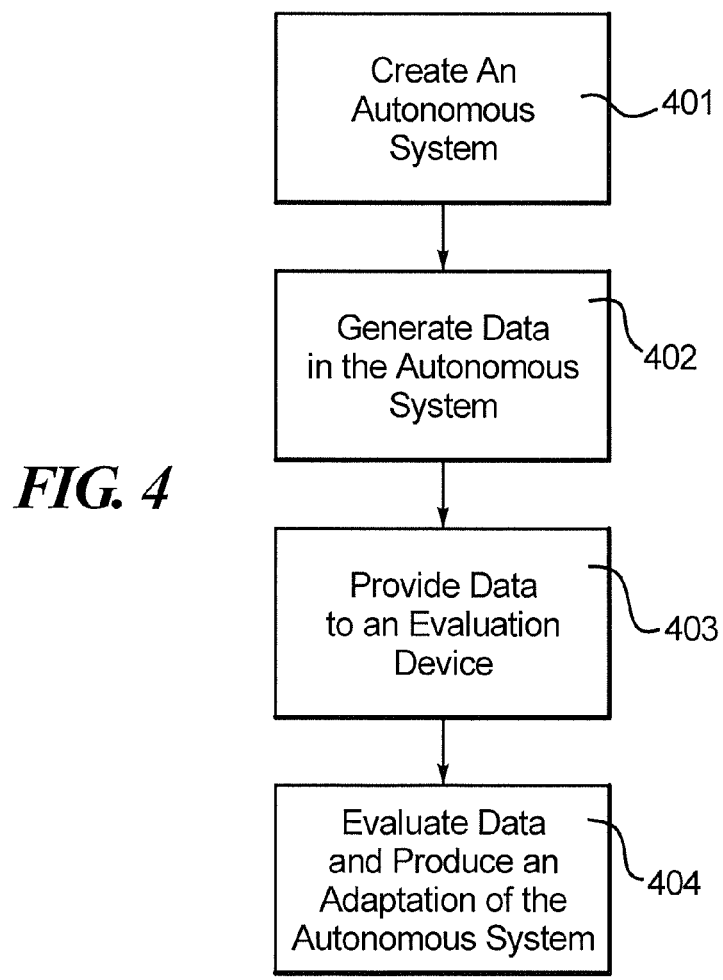
FIG. 3
FIG. 4

AUTONOMOUS SYSTEM, DEVICE AND METHOD TO PROVIDE DATA OF THE AUTONOMOUS SYSTEM

BACKGROUND OF THE INVENTION

1. Field of the Invention

The present invention concerns a device and a method to provide data of an autonomous system. The invention also concerns an autonomous system with such a device. Furthermore, the invention concerns a method to operate an autonomous system.

2. Description of the Prior Art

In various technical fields, for example the storage of goods, semi-automatic or completely automatic industrial systems are used that autonomously make decisions. Such systems are, for example, dockside cranes that automatically pick up and place containers, forklifts that autonomously move palettes, and automated excavators that can be used in mining. These autonomous systems determine their environment with the use of sensors. The autonomous systems implement actions based on these determinations.

Access to the data of the autonomous systems is typically required for development, maintenance, troubleshooting or the like. This access has conventionally been implemented directly in the autonomous system by a maintenance team or development team on site or via a remote connection. However, the storage capacities in the autonomous system are typically limited. The data therefore are available only to a limited extent. Furthermore, the operation of the autonomous system may possibly be interfered with or even interrupted by a direct access to the data in the autonomous system. Such an access to the data, on site or via a remote connection, can take a few days, but it is preferable for maintenance or troubleshooting to take place as quickly as possible.

SUMMARY OF THE INVENTION

In view of the above, an object of the present invention is to ensure an efficient and fast access to data of an autonomous system, preferably without interfering in the operation of the autonomous system.

Accordingly, a device in accordance with the invention, for providing data of an autonomous system configured to determine its environment with sensors and to generate environment models based thereon, is configured to receive from the autonomous system data generated by the autonomous system, to send the received data to an archiving device for storage, the archiving device being arranged external to the autonomous system, independently of the operation of the autonomous system; and to provide the stored data in a form for evaluation by an independent evaluation device.

According to a further aspect, an autonomous system in accordance with the invention includes an autonomous apparatus that is configured to determine data representing an examination volume with sensors and to generate environment models based on this data, and a device as described above for providing data of the autonomous system. This device is coupled with the autonomous system. Furthermore, the system has: an archiving device that is coupled with the device described above, and an evaluation device to control the autonomous system that is coupled with the archiving device and the autonomous system.

According to a further aspect, in a method in accordance with the invention to operate an autonomous system, which is configured to determine an environment with sensors and to generate environment models based thereon, data that have been generated by the autonomous system are stored in an archiving device and are provided to an independent evaluation device for operation of the autonomous system.

According to a further aspect, in a method to produce an autonomous system, an autonomous system is provided that is configured to determine an environment with sensors, and to generate environment models based thereon, the data that have been generated by the autonomous system are stored, independently of the operation of said autonomous system; and the autonomous system is adapted based on the stored data.

As explained, autonomous systems determine their environment with the use of sensors. Such sensors can be optical or acoustic sensors, motion sensors, position sensors or any type of sensors that can be used in order to generate environment models based on the received signals of the sensors. These environment models can be 3D or 2D models. These environment models serve to allow the autonomous systems to be able to determine actions by means of different algorithms based on these models, which actions they implement next. For example, pattern recognition and probability calculations can serve as algorithms. Therefore, as used herein an autonomous system means an automated or semi-automated system that perceives its environment, makes or plans decisions and implements actions autonomously (thus on its own and independently).

For example, the sensors can be laser scanners that scan the examination volume and hereby generate a scatter plot. Furthermore, the sensors can be gyroscopes, velocity sensors, GPS sensors, ultrasound sensors, radar sensors etc. The sensors can be used to determine internal statuses of the individual elements of the autonomous system and the external environment. The determined external environment can thereby initially correspond to lines and surfaces, thus surface structures. 3D models of the environment can subsequently be calculated based on these structures.

The data that are generated in the autonomous system are then sent to an archiving device, independent of the operation of the autonomous system. The operation of the autonomous system hereby does not need to be interfered with; the operation thus does need to be interrupted. For example, this archiving device can be a storage device.

For example, the stored data are provided to an independent evaluation device. The evaluation device is not part of the autonomous system, which means that it can be arranged remote from the autonomous system. The evaluation device serves to set up the autonomous system, for maintenance, to correct or diagnose faults or the like.

The device can be designed as part of the autonomous system. It can also be designed as a device external to the autonomous system. In one embodiment, the device can be designed as an expansion element for existing autonomous systems, which expansion element interacts with said autonomous system via an interface. The data of the autonomous system can be relayed to the device via the interface.

In the production of the autonomous system, the provided data are used in order to configure and calibrate the autonomous system. In this way, an autonomous system can simply be constructed at one location and be set up from another location. For example, this is desirable if the manufacturer or a maintenance team of the manufacturer is remote from the actual site of the autonomous system.

In the following embodiments of the device, the system and the method are explained in detail.

According to one embodiment, the autonomous system has devices that undertake autonomous actions. In particular, the system has one or more of a forklift, crane (dockside crane), autopilots, cleaning machines, construction machines, excavators, driver assistance systems.

An autonomous system can have multiple individual autonomous devices. These devices can be the same (for example multiple forklifts) or can also comprise different devices (for example forklifts and cranes). The autonomous system can be partially automated. This means that the environment is not entirely determined from the start. For example, interventions in the system by people can take place intentionally or unintentionally.

According to a further embodiment, the archiving device is set up to store the data over a predetermined time period.

The time period can be chosen to be arbitrarily long. For example, the time period can depend on the evaluation device. If the evaluation device serves to set up and calibrate the autonomous system, the time period can be chosen to be shorter; if the evaluation device serves for long-term maintenance and/or monitoring of the autonomous system, the time period should be chosen to be as long as possible. The archiving device can be designed to store the data redundantly. For this purpose, the archiving device can have two or more storage devices.

According to a further embodiment, the archiving device has a scalable storage, in particular a distributed storage.

Via the use of a scalable storage, the storage can be increased or reduced depending on the storage requirement. Instead of locally storing the accumulating data in a circular buffer of the autonomous system, according to this embodiment the data are stored in the archiving device. In contrast to a circular buffer in which the data are overwritten again after a defined time period after filling the memory, in a scalable storage the data can grow arbitrarily. Via the use of a distributed storage or storage system, the data can be stored in various individual storages at various locations, for example within the scope of a cloud computing system. In this way, a growing data set can be reacted to very flexibly.

According to a further embodiment, the received data are encoded.

In order to ensure the security of the autonomous system—for example against unauthorized interventions—the data can be encoded upon being sent from the autonomous system. An encoding in this case can represent a cryptographic encryption. Any type of cryptographic encoding that can prevent a reading, writing or other access to the data by unauthorized parties can be used as a cryptographic encryption.

According to a further embodiment, the device is set up to receive the data from the autonomous system via a network connection.

The data can be sent from the autonomous system to the archiving device via any type of network connection. This can be realized wirelessly or via wires. For example, counting among these are radio connections (such as NFC, WiFi, WLAN, Bluetooth, GSM, UMTS, LTE) or wired data networks (such as Ethernet, wired telephone networks etc.). A secure transmission (for example using VPN) can also be realized within the scope of the network connection.

According to a further embodiment, the device is set up to process the received data before storage.

Such a pre-processing can be used to prepare the received data for further processing by the evaluation device. For example, the access to the data by the evaluation device can be simplified and/or accelerated via such a pre-processing.

According to a further embodiment, the device is set up to index the received data.

For example, such a pre-processing can include an indexing. The indexing can include an automated subdivision of the data that are then provided with attributes. The various data can hereby be stored as a searchable database with the use of indexes. A further processing is thereby significantly simplified since the data can be retrieved via a search. The attributes can be timestamps or error events that can be appended to the data as metadata, for example.

The evaluation device can access the stored data via an interface between the evaluation device and the archiving device. Insofar as a connection exists between the evaluation device and the archiving device, the evaluation device can access all stored data at any time. In order to simplify the search for data, the evaluation device can use the aforementioned indexes or other attributes. The search can also be implemented by the archiving device upon request by the evaluation device, which archiving device then provides the relevant data to the evaluation device. For example, such a search can also include the search for location, type, serial number or other properties of the autonomous system.

According to a further embodiment, the device is set up to implement an automated detection of errors of the autonomous system.

Based on the data that are received from the autonomous system, the device can implement an automated error search. For example, this automated error search can be based on the fact that variations between data received earlier and data being currently received are established and automatically examined. A deviation from a stipulated threshold can also be used for error detection. As soon as an error has been detected, this can be communicated to the evaluation device, which can thereupon proceed with the error correction.

According to a further embodiment, the device is set up to receive data in predetermined time intervals and/or to continuously received data.

Depending on the system, the collected data are sent in a defined interval. For example, the interval can be an interval of a pair of hours, daily or weekly. For example, the interval can depend on the storage capacity of a locally present storage. The autonomous system can have a local storage that serves as a cache before the data are stored in the archiving device. In one embodiment, the data are continuously sent from the autonomous system to the archiving device, i.e. as a data stream in real time.

According to a further embodiment, the data include raw data and/or process data and/or protocol data.

For example, the raw data correspond to the data that are determined by sensors present in the autonomous system. Process data are created from the raw data in the calculation of the environment models. The process data can also include the decisions and the associated calculations that are based on the raw data. In addition to the raw data and the process data, the data can also include protocol data or log data. For example, these protocol data include information about implemented actions. In particular, data that would typically be discarded in the autonomous system are stored in the archiving device.

According to a further embodiment, the evaluation device is setup to adapt the autonomous system based on the provided data.

For example, an adaptation can include changes of parameters or, respectively, settings of the autonomous system; changes to algorithms or additional changes to the autonomous system that are based on an evaluation of the provided data. The evaluation device can hereby serve as a maintenance or production device, for example.

The invention also encompasses a non-transitory, computer-readable data storage medium encoded with programming instructions that, when loaded into a processor cause the processor to execute all steps in accordance with the invention described above, in any or all of the described embodiments.

The storage medium can be, for example, a memory card, USB stick, CD-ROM, or DVD.

The embodiments and features described for the inventive device apply as well to the inventive system and the inventive methods. Embodiments and features described for the system or the methods similarly accordingly apply to the device. Additional possible implementations of the invention include combinations of features or embodiments described in the preceding or in the following with regard to the exemplary embodiments, even though such combinations of features may not be explicitly cited. Those skilled in the art will be able to add individual aspects as improvements or extensions to the basic form of the invention.

BRIEF DESCRIPTION OF THE DRAWINGS

FIG. 1 shows a system in accordance with the invention to provide data of an autonomous system.

FIG. 2 shows a further embodiment of a system in accordance with the invention to provide data of an autonomous system.

FIG. 3 shows a method in accordance with the invention to provide data of an autonomous system.

FIG. 4 shows a method in accordance with the invention to provide an autonomous system.

DESCRIPTION OF THE PREFERRED EMBODIMENTS

Identical or functionally identical elements have been provided with the same reference characters in the figures insofar as not indicated otherwise.

FIG. 1 shows a system 100 to provide data of an autonomous system 102. The autonomous system 102 can have one or more autonomous devices. These determine their environment based on sensor data, and implement actions based on these sensor data. The data that are thereby accumulated or generated are sent by the autonomous system 102 to a data transfer device 101 or are received by the device 101, as indicated by arrow 103. For example, the autonomous system 102 can have memory-programmable circuits (SPS) or program logic controllers (PLC). These can be used in order to regulate or control the autonomous system 102.

The device 101 is designed to send the received data to an archiving device 104. The received data are stored in the archiving device 104. The stored data can be provided to an evaluation device 106. The evaluation device 106 can retrieve the stored data in defined intervals, or a communication that a defined event (such as an error) has occurred and that the evaluation device 106 should retrieve the data is received from the device 101 or the archiving device 104.

Based on the provided data, the evaluation device 106 can implement actions to or in the autonomous system 102, for example adapt the autonomous system 102. For example, adaptation of the autonomous system 102 can include a calibration, setup or adjustment of the autonomous system 102. Since the data that are required by the evaluation device 106 are not stored in the autonomous system 102, but rather are stored separately from this in the archiving device 104, the evaluation device 106 does not need to access the autonomous system 102. An access by the evaluation device 106 to the autonomous system 102 takes place only within the scope of the adaptation.

The evaluation device 106 can also use the archiving device 104 as a basis for new development or as a test environment.

It can hereby be utilized that a time-decoupled playback of the stored data is possible, and that no real-time monitoring is required.

In a further embodiment, a feedback channel can be realized between the device 101 or, respectively, the archiving device 104 and the autonomous system 102. Such a feedback channel can be used in order to enable data exchange between autonomous systems 102. An exchange of an object database can in particular take place given autonomous systems 102 of the same type. In this way, objects that have been detected and calculated once no longer need to be recalculated since they are already stored in the archiving device 104.

In FIGS. 1 and 2, the data flows are indicated by the arrows 103, 105, 107 and 108. In step 103 a transmission or reception of data between the autonomous system 102 and the device 101 takes place. Step 105 is a transmission or reception of data between the device 101 and the archiving device 104. Step 107 is a provision of data from the archiving device 104 to the evaluation device 106. Arrow 108 represents a signal flow between the evaluation device 106 and the autonomous system 102. The signal flow 108 can be an adaptation of the autonomous system 102. The autonomous system 102 can send a feedback in this regard to the evaluation device 106.

The archiving device 104 can be a scalable, distributed storage. In the system 200 of FIG. 2, for example, the archiving device 104 is shown as a cloud storage. Any other type of storage can also be used. A long-term archive that can be arbitrarily expanded as needed can be provided via such a scalable storage.

As shown in FIG. 2, a pre-processing 201 of the data can be implemented in the archiving device 104 before or during the storage of the received data 103 or, respectively, 105. This pre-processing can also be implemented entirely or partially in the device 101 or in the autonomous system 102. Since the pre-processing 201 is implemented separately or, respectively, independently from the autonomous system 102, the pre-processing 201—thus an activity at the data archive—does not affect the power or, respectively, performance of the autonomous system 102 or, respectively, of elements (such as CPU, memory etc.) of the autonomous system 102.

Such a pre-processing 201 serves to structure the received data in order to simplify the access to or, respectively, the use of the data. For example, the arriving data 105 can be indexed in order to simplify the access and to enable a search for specific data. The arriving data 105 can already be examined for error events within the scope of the pre-processing 201 upon being received by the archiving device 104. For example, operating messages, warning messages and error notifications can be detected and communicated (for example to the evaluation device 106). Downtimes—i.e. times without data—can also be detected upon reception.

Via the pre-processing 201, the data 105 can be prepared for diagnosis by the evaluation device 106. Idle times can thus be removed from the data, or additional information (such as values calculated from the raw data) can be added. Furthermore, multiple data streams of different autonomous systems 102 can be combined in order to provide a global knowledge.

Different conversions of the data can be implemented in the transmission of said data from the autonomous system 102 to the evaluation device 106. This can be necessary—or at least helpful—in order to provide the data in the required format to each element.

As has already been explained, the device 101 can be used in order to provide data of an autonomous system 102. FIG. 3 shows a flow diagram of a corresponding method. As explained above, data that are generated 301 in the autonomous system 102 are stored 302 in an archiving device 104.

These stored data can be provided 303 to an independent evaluation device 106. The autonomous system 102 can operate the evaluation device 106 based on these data.

Via the provision 303 of the data, the evaluation device 106 can quickly access the data and operate the autonomous system 102 (for example make changes to settings) without the data needing to be transmitted from the autonomous system 102 to the evaluation device 106 via complicated or costly methods.

The device 101 can also be used in order to produce an autonomous system 102. This is explained in detail in FIG. 4. In a first step 401, the autonomous system 102 is provided. For example, the autonomous system 102 can be constructed by learning, as a neural network. The autonomous system 102 can start operations as a test, wherein data that are generated 402 by the autonomous system 102 are collected and provided in step 403 by the device 101 to the evaluation device 106.

The evaluation device 106 can subsequently examine the data and produce an adaptation 404 of the autonomous system 102. The adaptation can correspond to an adjustment or calibration of the autonomous system 102. A remote calibration of the autonomous system 102 can be enabled in this way.

Although modifications and changes may be suggested by those skilled in the art, it is the intention of the inventors to embody within the patent warranted hereon all changes and modifications as reasonably and properly come within the scope of their contribution to the art.

We claim as our invention:

1. A system to provide data, comprising;
    an autonomous apparatus comprising components that operate in an apparatus environment of the apparatus, sensors that generate sensor data describing the apparatus environment of the autonomous apparatus, and an apparatus processor provided with said sensor data and configured to generate environment models based thereon that model said apparatus environment;
    a data transfer processor, in communication with said apparatus processor, that is provided with said models from said apparatus processor;
    said data transfer processor being configured to transfer the received models to an archiving device for storage in said archiving device, said archiving device being external to said autonomous apparatus and independent of operation of said autonomous apparatus;
    a feedback channel between said data transfer processor and said apparatus processor that prevents models from being redundantly re-generated in said apparatus processor that have already been generated and transferred to said transfer processor;
    an independent evaluation computer having access to said archiving device; and
    said independent evaluation computer being configured to evaluate said models independently of ongoing operation of said autonomous system and to generate calibration data dependent on the evaluation of the models, and said evaluation computer being configured to transmit said calibration data to said apparatus components of said autonomous apparatus, and said apparatus components being calibrated within said autonomous apparatus by said calibration data.

2. A system as claimed in claim 1, wherein said archiving device is configured for scalable storage of said models.

3. A system as claimed in claim 2, wherein said archiving device is configured for distributed storage of said models.

4. A system as claimed in claim 1, wherein said data transfer processor is configured to encode data in the received models prior to transfer of the models to said archiving device.

5. A system as claimed in claim 1, wherein said data transfer processor comprises a network interface configured to receive the models from the apparatus processor via a network.

6. A system as claimed in claim 1, wherein said data transfer processor is configured to pre-process said models prior to transfer of the models to the archiving device.

7. A system as claimed in claim 6, wherein said data transfer processor is configured to index data in the models received from the apparatus processor.

8. A system as claimed in claim 6, wherein said evaluation computer is configured to implement automatic detection of errors in the autonomous apparatus.

9. A system as claimed in claim 1, wherein the data transfer processor is configured to receive said models from the apparatus processor at predetermined time intervals.

10. A system as claimed in claim 1, wherein said data transfer processor is configured to receive the models from the apparatus processor continuously.

11. A system as claimed in claim 1, wherein said archiving device is configured to store said models for a predetermined time duration.

12. A system as claimed in claim 1 wherein said autonomous apparatus wherein said apparatus components are selected from the group consisting of forklifts, cranes, autopilots, cleaning machines, construction machines, excavators, and driver assistance devices.

13. A system as claimed in claim 1 wherein said apparatus processor is configured to generate said environment models comprising at least one of raw data, processed data, and protocol data.

* * * * *